US009684719B2

United States Patent
Ostrovsky-Berman et al.

(10) Patent No.: US 9,684,719 B2
(45) Date of Patent: Jun. 20, 2017

(54) OBJECT SEARCH BY DESCRIPTION

(71) Applicant: Verint Systems Ltd., Herzilya Pituach (IL)

(72) Inventors: Yaron Ostrovsky-Berman, Petach Tikva (IL); Ran Gur, Kiryat Ono (IL); Nir Naor, Ramat Hasharon (IL); Ran Wronsky, Rison LeZion (IL); Michael Milman, Kiryat Ono (IL)

(73) Assignee: Verint Systems Ltd., Pituach (IL)

( * ) Notice: Subject to any disclaimer, the term of this patent is extended or adjusted under 35 U.S.C. 154(b) by 358 days.

(21) Appl. No.: 14/100,888

(22) Filed: Dec. 9, 2013

(65) Prior Publication Data
US 2014/0161314 A1  Jun. 12, 2014

Related U.S. Application Data

(60) Provisional application No. 61/735,191, filed on Dec. 10, 2012.

(51) Int. Cl.
*G06K 9/00* (2006.01)
*G06F 17/30* (2006.01)

(52) U.S. Cl.
CPC .... *G06F 17/30864* (2013.01); *G06F 17/3079* (2013.01); *G06K 2209/27* (2013.01)

(58) Field of Classification Search
None
See application file for complete search history.

(56) References Cited

U.S. PATENT DOCUMENTS

| | | | | |
|---|---|---|---|---|
| 2006/0078047 | A1* | 4/2006 | Shu | G06F 17/3079 375/240.01 |
| 2006/0256210 | A1* | 11/2006 | Ryall | G06F 17/30843 348/231.2 |
| 2008/0100704 | A1* | 5/2008 | Venetianer | G06F 17/3079 348/143 |
| 2010/0026802 | A1* | 2/2010 | Titus | G08B 13/19608 348/143 |
| 2013/0155229 | A1* | 6/2013 | Thornton | H04N 7/18 348/143 |

* cited by examiner

*Primary Examiner* — Vu Le
*Assistant Examiner* — Guillermo Rivera-Martinez
(74) *Attorney, Agent, or Firm* — Christopher M. Scherer; DeWitt Ross & Stevens S.C.

(57) ABSTRACT

Systems and methods search video data for objects that satisfy a general object description. A database is populated with identified objects and object characteristics detected in video data with at least one identifier that specifies video image data. At least one search parameter is received that presents a general object description. The database is queried based upon the received at least one search parameter. At least one identifier is returned from the database based upon the at least one search parameter.

7 Claims, 4 Drawing Sheets

OBJECT SEARCH BY DESCRIPTION

CROSS-REFERENCE TO RELATED APPLICATION

The present application claims priority of U.S. Provisional Patent Application No. 61/735,191, filed on Dec. 10, 2012, the content of which is hereby incorporated herein by reference in its entirety.

BACKGROUND

The present disclosure is related to the field of video analytics. More specifically, the present disclosure is related to searching video data for objects that satisfy a general description.

Wide spread deployment of closed-circuit television (CCTV) cameras in various environments can lead to the production of an excess of video information that can impede effective review by surveying personnel. Exemplarily, if ten CCTV cameras are deployed about an environment constant monitoring of the environment will produce 240 hours of video data per day for consideration and review. Even using, expedited reviewing techniques, this presents a burden upon a person or persons tasked with manual review of image data.

A need exists for solutions to facilitate the narrowing of the available video data to only segments of video data that may be of particular interest to the reviewing personnel relative to a particular video data analysis purpose or task.

BRIEF DISCLOSURE

An exemplary embodiment of a method of searching image data for objects includes a database populated with metadata identified from image data. The metadata is associated with an identifier that specifies the image data associated with the metadata. At least one search parameter associated with the metadata is received with a searcher engine operating on a processor. The database is queried with the searcher engine based upon the received at least one search parameter. At least one identifier associated with the metadata is returned that meets the query based upon the received at least one search parameter.

An exemplary embodiment of a method of image data storage and retrieval includes video image data acquired from a plurality of cameras. The acquired video image data includes an identifier indicative of a camera of the plurality of cameras that acquired the video image data and a time stamp of when the video image data was acquired. A plurality of objects and object characteristics are detected in the acquired video image data from the plurality of cameras. The detected objects, object characteristics and identifiers associated with each detected object are stored in the database. At least one search parameter is received at a searcher engine operating on a processor. The database is queried for object characteristics based upon the received at least one search parameter. The identifier associated with each object characteristic meeting the query is returned based upon the received at least one search parameter.

A system for image data storage and retrieval, includes a plurality of cameras that operate to acquire video image data from a plurality of locations. An object detection engine receives the acquired video image data and identifies objects and object characteristics within the video image data. An object database is stored on a computer readable medium. The object database stores the identified objects and object characteristics with an identification of the video image data from which the objects and object characteristics are identified. A user interface is operable by a processor that is configured to receive at least one search parameter. A searcher engine is operable by the processor to receive at least one search parameter from the user interface. The searcher engine is further operable by the processor to query the object database based upon the at least one search parameter and receive returned query results comprising at least one object, at least one object characteristic, and at least one identification of the video image data from which the objects and object characteristics are identified. The returned query results are presented on the user interface.

DETAILED DISCLOSURE

Figure 1:
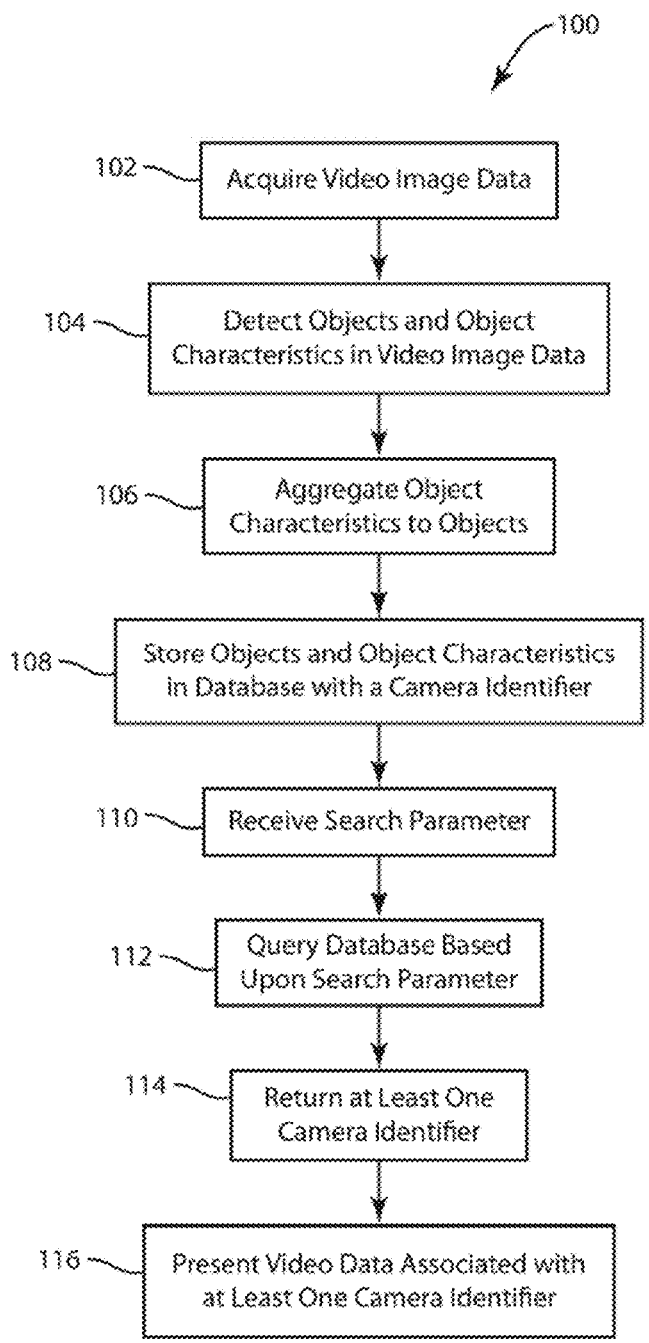
FIG. 1 is a flowchart of an exemplary embodiment of a method of searching image data for objects.
Figure 2:
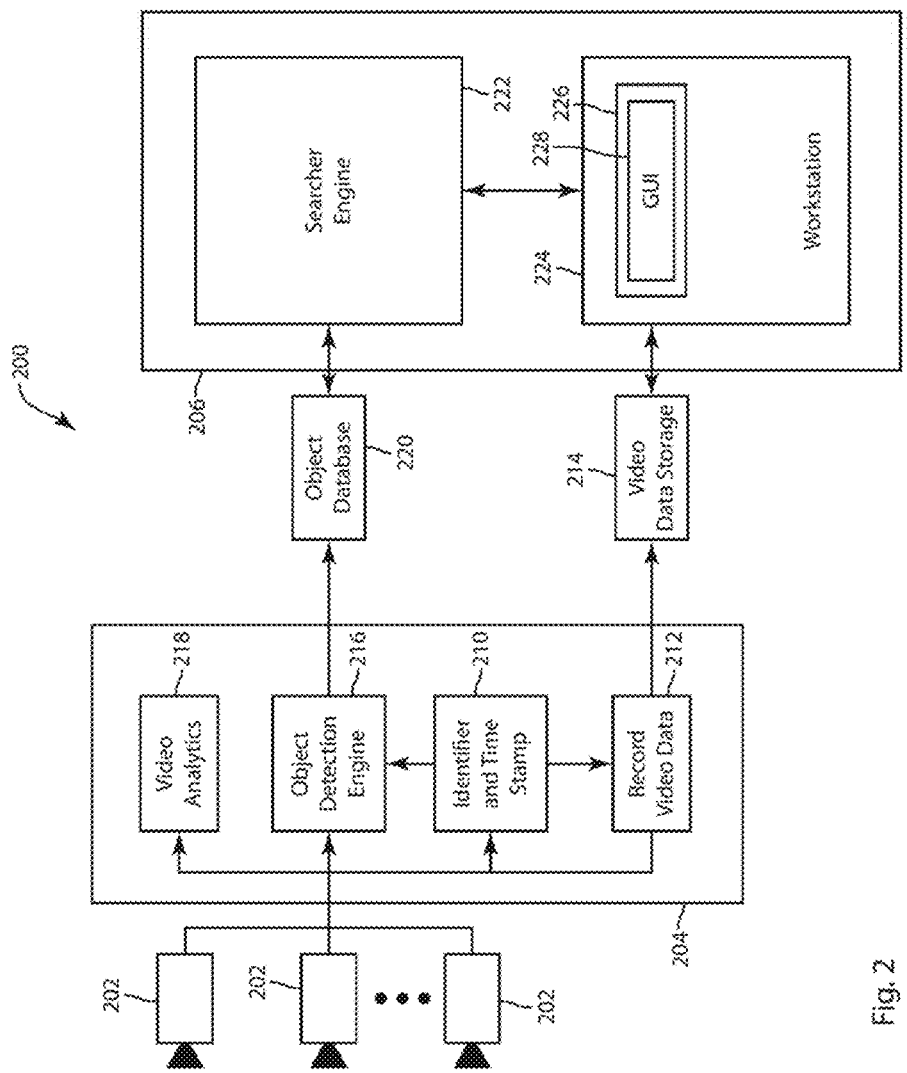
FIG. 2 is a system diagram of an exemplary embodiment of a system for image data storage and retrieval.

FIG. 1 is a flow chart that depicts and exemplary embodiment of a method 100 of searching image data for objects, as will be described in further detail herein. FIG. 2 is a system diagram of an exemplary embodiment of a system for image data storage and retrieval, as will be described in further detail herein.

Figure 3:
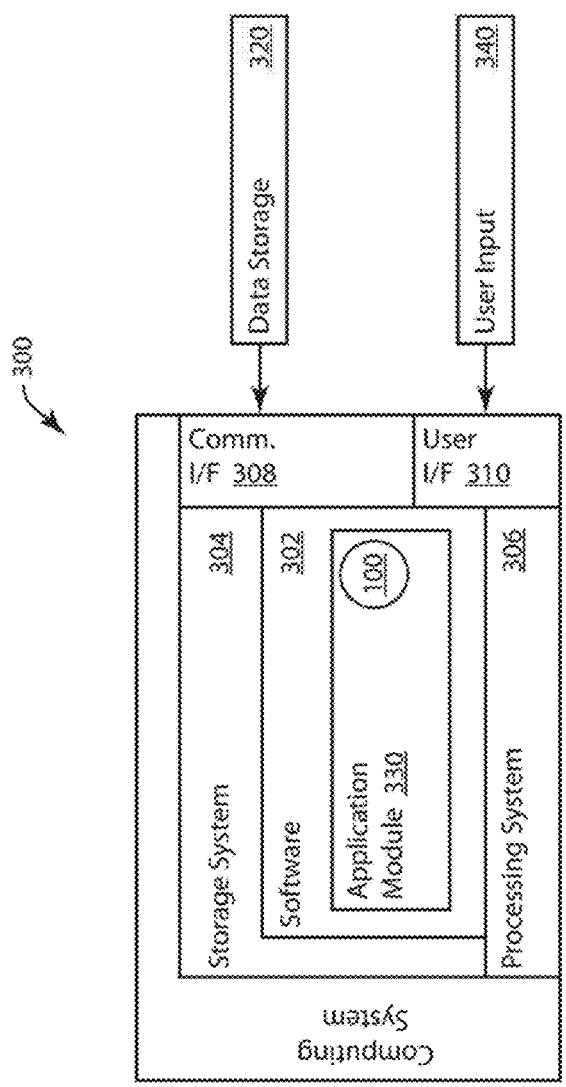
FIG. 3 is a system diagram of an exemplary embodiment of a system for image data storage and retrieval.

FIG. 3 is a system diagram of an exemplary embodiment of a computing system 300 as may be used to implement embodiments of the method 100, or in carrying out embodiments of portions of the system 200. The computing system 300 includes a processing system 306, storage system 304, software 302, communication interface 308, and a user interface 310. The processing system 306 loads and executed software 302 from the storage system 304, including a software module 330. When executed by the computing system 300, software module 330 directs the processing system to operate as described herein in further detail in accordance with the method 100, or a portion thereof.

Although the computing system 300 as depicted in FIG. 3 includes one software module in the present example, it is to be understood that one or more modules could provide the same operations or that exemplary embodiments of the method 100 may be carried out by a plurality of modules. Similarly, while the description as provided herein refers to a computing system 300 and a processing system 306, it is to be recognized that implementations of such system can be performed by using one or more processors, which may be communicatively connected, and such implementations are considered with be within the scope of the description. Exemplarily, such implementations may be used in carrying out embodiments of the system 200 depicted in FIG. 2.

Referring back to FIG. 3, the processing system 306 can comprise a microprocessor or other circuitry that retrieves and executes software 302 from storage system 304. Processing system 306 can be implemented within a single processing device but can also be distributed across multiple processing devices or sub-systems that cooperate in executing programming instructions. Examples of processing system 306 includes general purpose central processing units, application specific processor, and logic devices, as well as any other type of processing device, combinations of processing device, or variations thereof. The storage system 304 can include any storage media readable by the processing system 306 and capable of storing the software 302. The storage system 304 can include volatile and non-volatile, removable and non-removable media implemented in any method of technology for storage of information such as computer readable instructions, data structures, program modules or other data. Storage system 304 can be implemented as a single storage device but may also be implemented across multiple storage devices or sub-systems. Storage system 304 can further include additional elements, such as a controller capable of communicating with the processing system 306.

Examples of storage media include random access memory, read only memory, magnetic disc, optical discs, flash memory, virtual and non-virtual memory, magnetic sets, magnetic tape, magnetic disc storage or other magnetic storage de ices or any other medium which can be used to store the desired information and that may be accessed by an instruction execution system, as well as any combination or variation thereof, or any other type of storage medium. In some implementations, the storage media can be a non-transitory storage media. It should be understood that in no case is the storage media propagated signal.

User interface 310 can include a mouse, a keyboard, a voice input device, a touch input device for receiving a gesture from a user, a motion input device for detecting non-touch gestures, and other motions by a user, and other comparable input devices and associated processing elements capable of receiving user input from a user. User interface 310 can also include output devices such as a video display or a graphical display can display an interface associated with embodiments of the systems and methods as disclosed herein. Speakers, printers, haptic devices, and other types of output devices may also be included in the user interface 310. The user interface 310 is configured to receive user inputs 340 which in non-limiting embodiments may be search parameters as disclosed in further detail herein. It is also understood that embodiments of the user interface 310 can include a graphical display that presents search results and further is configured to present video image data as a result of the search results as disclosed in further detail herein.

In embodiments, the communication interface 308 is communicatively connected to data storage 320. The data storage 320 may be configured or implemented in any of the manners as described above with respect to the storage system 304. In exemplary embodiments as disclosed herein, the data storage 320 is configured to store video image data, object data, and object characteristic data, as will be described in further detail herein and may be implemented in one or more data storage devices.

FIG. 1 is a flow chart of an exemplary embodiment of a method 100 of image data storage and retrieval. It is to be understood that the embodiment of the method 100 depicted in FIG. 1 is merely exemplary and the steps and features as disclosed herein may occur in an alternative order and steps may be added or removed and remain within the scope of the present disclosure.

An exemplary embodiment of the method 100 begins at 102 with the acquisition of video image data which may exemplarily be from a plurality of CCTV video cameras deployed about a monitored environment. In a non-limiting example as will be used for exemplary purposes herein, the monitored environment may be a store. The plurality of cameras acquire video image data, which in exemplary embodiments may be a stream of video data. It will be understood that some embodiments may be implemented in conjunction with real-time image processing and analytics in which case some of the features of the method 100 may also be implemented in real-time. However, it will be recognized that in other embodiments, the acquired video image data may be processed as disclosed herein in an offline or non-real-time setting.

The acquired video image data from 102 is processed by an object detection engine, which may operate on an embodiment of the computing system 300 described above with respect to FIG. 3. The object detection engine processes each incoming frame of video image data and detects instances of predefined objects (e.g. humans, vehicles, shopping carts, etc.) at 104. At least one object characteristic is detected for each of the detected objects in the frame of video image data. Object characteristics may be a type of specific descriptor that reflects a property of a specific instance of the predefined detected object. In exemplary embodiments, such object characteristics may be a color or may be an overall estimated height or relative height of the object. In another example, the object characteristics can include a calculated velocity or direction of the object. In such examples, the object detection engine can calculate a movement vector for the object in the video image data. Additionally, the object characteristic may be a color or estimated size of a particular defined portion of a detected object. In an exemplary embodiment, the detected object is a human and the object characteristics may be a color of a basic article of clothing (e.g. shirt or pants) which may be identified as a sub-portion of a detected human object. In still other embodiments, the object characteristic may be another feature of the human object such as a hair color.

At 106 the identifications of the detected object characteristics and detected objects are aggregated. In the aggregation at 106 all of the object characteristics that belong to a single detected object are grouped in association to one another and to the detected object. In another embodiment, the aggregated object characteristics may come from other sources apart from the identifications at 104, and may include other object characteristics not stored in the database as described herein.

At 108 the identifications of the aggregated objects and object characteristics are stored in a database. Additionally, the object and object characteristic are stored in the database at 108 along with an identifier which may be an identification number or code that represents the camera of the plurality of cameras used to acquire the video image data in which the objects and object characteristics were detected, as well as an indication of the frames and/or a time stamp of when the video data was acquired. In an embodiment, the aggregated identifications of objects and object characteristics may be stored on a frame by frame basis or the aggregated objects and object characteristics may be stored with an indication of as representative range of the video image data from an identified camera in which those objects and object characteristics are found. The database may be organized in any manner that allows for efficient retrieval. In non-limiting embodiments, the database may index the aggregated objects and object characteristics by the camera that acquired the video image data; time, time stamp, or frame number; or by a dominant object characteristic, such as a dominant color of the object.

Figure 4:
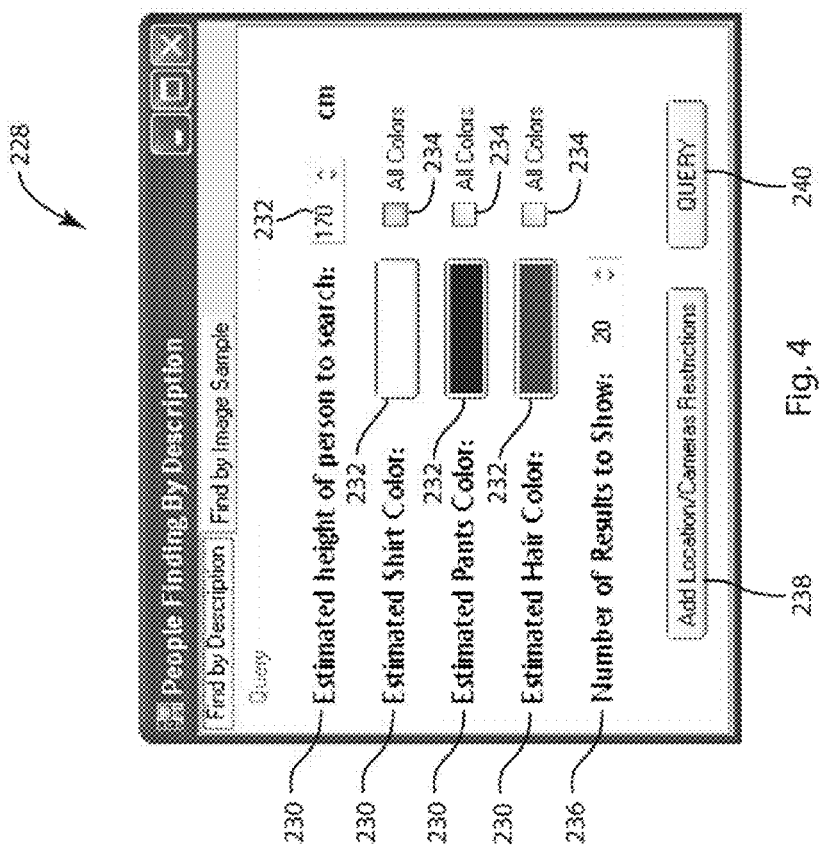
FIG. 4 depicts an exemplary embodiment of a graphical user interface in accordance with embodiments as disclosed herein.

At 110, the method 100 is used to search the database in order to identify video data that contains an object meeting a specified description. At 110 at least one search parameter is received through a user interface. As will be described in further detail herein, FIG. 4 depicts an exemplary embodiment of a graphical user interface (GUI) which may be presented to a user and is operable to receive the at least one search parameter. In exemplary embodiments, the received search parameter may specify general categories or properties of the object of interest, such as, but not limited to height or object sub-portion color. Additionally, the search parameters may include specific cameras, locations, times, or dates, within which the video image data is of interest. In still further embodiments, the search parameter may include user preferences on the display of returned search results which may include, but is not limited to an image grid or a list, and such user preferences may also include a number of results per page or other preferences as may be recognized by a person of ordinary skill in the art.

The at least one search parameter received at 110 is provided to a searcher engine, which may exemplarily be carried out on a computing system as described above with respect to FIG. 3. The searcher engine operates to query the database based upon the at least one search parameter received at 112. In querying the database based upon the at least one search parameter, the search parameters may be translated into database queries which may specify exact object targets and specific object properties encoded by the individual and aggregated objects and object characteristics as stored in the database. In another embodiment, the at least one search parameter received at 110 is automatedly generated, exemplarily by a periodic, routine that checks for abnormal occurrences or objects of interest. A non-limiting example includes a daily search for all identified objects that exceeded a specified velocity in that day's worth of video image data.

The queries to the database return at least one database entry at 114. The returned database entry at 114 includes the camera identifier associated with the stored objects and object characteristics that met the database query. In embodiments, a plurality of results are returned from the database at 114 and are sorted by relevancy, and presented in an order of relevancy on the graphical display of the user interface. In an embodiment, the relevancy by which the results are sorted is a similarity score between the object characteristics and the at least one search parameter. A similarity function may be applied to calculated this similarity score.

The visual presentation of the returned results may exemplarily include a link to the stored video image data associated with each of the returned camera identifiers. Selection of the link results in the presentation of the video data associated with the at least one camera identifier at 116. The video data is exemplarily presented on the graphical display. In an alternative embodiment, a thumb nail image, snap shot, or cropped frame of the video data associated with each of the returned camera identifiers is presented. While it will be recognized that in alternative embodiments, other manners of presenting the video data directly, or a link or pointer to the video data may be presented in the returned results.

FIG. 2 depicts an exemplary embodiment of a system 200 for video image data storage and retrieval. The system 200 includes at least one camera. 202 and in embodiments a plurality of cameras 202. As described above, the cameras are exemplarily CCTV cameras arranged at a variety of locations around an environment to be monitored. Each of the cameras 202 acquires a stream of video image data, exemplarily digital video image data.

The system 200 includes a front end 204 and a back end 206 as will be described in further detail herein. In exemplary embodiments, the front end is used as described herein to process the video image data as it is acquired by the cameras 202. The back end 206 operates to search query, retrieve the results, and display the results in an informative manner. In a non-limiting embodiment, each of the front end 204 and the back end 206 are implemented on a computing system 300 as described above with respect to FIG. 3.

The front end 204 includes a plurality of modules for features for processing the acquired video image data, and in an exemplary embodiment, the front end 204 may be implemented with a computing system 300 as described, with respect to FIG. 3. The front end 204 includes and identifier and time stamper 210 that identifies each of the streams of video image data as being associated to a particular camera 202 of the plurality of cameras. The time stamper 210 also provides a time stamp associated with each frame of the acquired video image data. In an embodiment, the identifier and time stamper 210 may be a part of the camera 202, or may be implemented in the front end 204 as the video image data is received from each of the cameras 202. The front end 204 also operates to record the acquired video image data at 212 in which the front end 204 operates to store the acquired streams of video image data along with an identification of the camera and the time stamp associated with each frame of the video image data at video data storage 214. In exemplary embodiments, the video data storage 214 may be any of a variety of computer readable media as described above with respect to the storage system 304 in FIG. 3.

Returning, back to FIG. 2, the front end 204 further includes an object detection engine 216 that processes the streaming video image data acquired by each of the cameras 202 on a frame by frame basis in order to detect instances of predefined objects and to calculate at least one object characteristic of the detected object. The object detection engine 216 may also aggregate the detected object and object characteristics such that all of the object characteristics that belong to the same object are grouped together. The object detection engine 216 may operate as its own module or may be a part of a video analytics module 218 of the front end 204. In an embodiment wherein the video analytics module 218 is apart from the object detection engine 216 the video analytics module 218 may apply image detection, recognition, or interpretation algorithms against the frames of the acquired video image data such as to produce automated analysis of the events and conditions occurring in the acquired video image data.

The object detection engine 216 operates to store the aggregated detected objects and object characteristics in an object database 220. The object database 220 may be implemented on any of a variety of known computer readable media as described above, and may operate to store identifications of the aggregated detected objects and object characteristics in association with an identification of the video image data in which the objects and object characteristics were detected. Exemplarily, this identification identifies the camera that acquired the video image data and a time stamp associated with a frame or frames in which the objects and object characteristics were detected. Such information may exemplarily be provided by the identifier and time stamper 210 of the front end 204. The object database 220 can store this information in a manner that allows for efficient retrieval. In non-limiting embodiments, the object database 220 is arranged to index the object instances by camera, camera location, a dominant object characteristic, or temporally by time stamp or frame number.

As described above, the back end 206 of the system 200 operates to generate search queries, retrieve search results and present the returned search results to a user in an informative and useful manner. In an exemplary embodiment, the back end 206 may be implemented with a computing system 300 as depicted and described above with respect to FIG. 3. The back end 206 includes a searcher engine 222 that receives at least one search parameter entered at a user workstation 224 by a user. The workstation 224 can include a graphical display 226 and a graphical user interface (GUI) 228 which is visually presented on the graphical display 226. The user may interact with the GUI 228 presented on the graphical display 226 of the workstation 224 in order to enter at least one search parameter.

FIG. 4 depicts an exemplar embodiment of a GUI 228 as may be presented by the workstation 224 on the graphical display 226. Referring to FIG. 4, the GUI 228 may include a plurality of prompts 230 and one or more drop down menus 232 or radio buttons 234 in order to input various search parameters. In alternative embodiments, search parameters may be entered with a text field. The GUI. 228 depicted in FIG. 4 is exemplarily an embodiment for providing a description of a person to be found in video image data. The GUI 228 may further include an entry of user preferences 236 such as a number of results to show or a preferred layout for the query results. The GUI 228 may further include search options to select or limit the cameras and/or locations from which video image data was acquired and to select times and/or dates of video image data that should be searched, exemplarily by selection of a button at 238. In an exemplary embodiment by selecting the query button 240, the work station 224 provides the at least one search parameter to the searcher engine 222. The searcher engine translates the users request into queries to the object database 220 by specifying the exact objects and object characteristics identified by the object detection engine 216 and stored in the object database 220. The object database 220 returns results to the searcher engine 222 which sorts the results by relevancy and presents the results on the graphical display 226 of the workstation 224. In an exemplary embodiment, the presentation of the results includes the identification of the video image data from which the objects and object characteristics were identified, exemplarily with a hyperlink to the video image data stored at the video data storage 214. A selection of such hyped ink at the workstation 224 causes the workstation 224 to access the identified video image data from the video data storage 214 and present the identified image data on the graphical display 226.

In embodiments of the systems and method as disclosed herein, advantages in user workflow and video image data analysis are achieved in that the detection of the objects and object characteristics can be implemented as the video data is acquired and the video data can be stored at a location and format suitable for the storage of video data while the identified objects and object characteristics can be stored in a separate object database that is easily searched and queries by the back end 206 to enable a user to quickly and efficiently produce a list of identified objects in video data which may meet a generalized description of an object of interest. This saves the user from manually reviewing of the video data and enabling the user to focus manual review time to only image data that includes objects that meet the general description of the objects of interest.

It will be recognized that in embodiments, the user may establish the search parameters in a variety of manners and not show limited to those as described above with respect to the GUI in FIG. 4. Alternatively, search parameters that include Boolean operators such as and or may be included, exemplarily as to enter search parameters in the alternative (e.g. red or orange shirts; red shirt or pants; brown or black hair). Similarly height, date, or time ranges may also be employed to restrict or broaden search results.

By way of an example, an exemplary embodiment of the system and method may be employed in a retail setting such as track and/or identify shoplifters. A reported shoplifter may have a known general description, exemplarily a height, hair color or shirt color. The search parameters may be used to provide a list of all of the video image data from the retail store that includes a person meeting this general description. The search results may be refined by focusing in on those cameras that cover a particular department or the path to or from a particular department, exemplarily an electronics department. The search results may be further refined by the identification of a time and/or date range in which the thefts are thought to occur. After the refined results are identified from the object database and presented at the user workstation, the user workstation can be used to access the video clips associated with the returned results of objects and/or object characteristics that meet generalized description. The user then need only review this focused set of video clips without the need to review video clips that don't include any individuals meeting the general description of the search parameters.

In a still further embodiment, a city or municipality may have a plurality of cameras deployed at intersections throughout the city. In a police investigation for a missing person, a suspect, or a vehicle of interest, video data that has been acquired in accordance with the systems and methods as disclosed herein may be searched to identify only those video instances that include images meeting the general description of the person or car or other object of interest.

This written description uses examples to disclose the invention, including the best mode, and also to enable any person skilled in the art to make and use the invention. The patentable scope of the invention is defined by the claims, and may include other examples that occur to those skilled in the art. Such other examples are intended, to be within the scope of the claims if they have structural elements that do not differ from the literal language of the claims, or if they include equivalent structural elements with insubstantial differences from the literal languages of the claims.

What is claimed is:
1. A method of image data storage and retrieval, the method comprising:
  acquiring video image data from a plurality of cameras, the acquired video image data comprising an identifier indicative of a camera of the plurality of cameras that acquired the video image data and a time stamp of when the video image data was acquired;
  detecting a plurality of objects in the acquired video image data from the plurality of cameras;
  detecting, for each detected object, object characteristics in the acquired video image data;
  obtaining, for each detected object, other object characteristics from a source other than the acquired video image data;
  aggregating, for each detected object, (i) the object characteristics detected in the acquired video image data and (ii) at least a portion of the object characteristics obtained from a source other than the acquired video image data;
  storing, in a database, each detected object, each detected object's aggregated characteristics and each detected object's associated identifier;

receiving search parameters and Boolean operators at a searcher engine operating on a processor, wherein the search parameters correspond to a user's estimate of an object's characteristics;

querying the database for object characteristics based upon the received search parameters and Boolean operators;

returning identifiers meeting the query based upon the received search parameters and Boolean operators;

computing a similarity score for each returned identifier, wherein the similarity score corresponds with how closely a detected object's characteristics match the query;

sorting the returned identifiers by similarity score; and refining the sorted identifiers by removing identifiers that did not originate from one or more selected cameras in the plurality of cameras during a selected period of time; and presenting the sorted and refined identifiers as images, wherein each image displays the detected object and is linked to corresponding stored video image data of the detected object.

2. The method of claim 1, wherein the plurality of objects and object characteristics are detected in real time with the acquisition of the video image data.

3. A system for video image data storage and retrieval, the system comprising:

a plurality of cameras that operate to acquire video image data from a plurality of locations;

an object detection engine that receives the acquired video image data and identifies objects and object characteristics within the video image data;

an object database stored on a computer readable medium that stores the identified objects and object characteristics with an identification of the video image data from which the objects and object characteristics are identified;

a user interface operable by a processor that is configured to receive search parameters and Boolean operators, wherein the search parameters correspond to a user's estimate of an object's characteristics; and a searcher engine operable by the processor to receive the search parameters and Boolean operators from the user interface and query the object database based upon the search parameters and Boolean operators, receive returned query results comprising at least one object, at least one object characteristic, and at least one identification of the video image data from which the objects and object characteristics are identified;

wherein the returned query results are sorted in an order of a similarity scored that corresponds with how closely a detected object's characteristics matches the query, and wherein the returned query results are refined by removing results that did not originate from one or more selected cameras in the plurality of cameras during a selected period of time; and wherein the sorted and refined results are presented as images that display the detected object and that are linked to corresponding stored video image data of the detected object.

4. The system of claim 3, wherein the object detection engine operates in real time to identify objects and object characteristics within the video image data.

5. The system of claim 4, further comprising:

an object aggregator that (i) receives the identified objects and object characteristics from the object detection engine, (ii) receives other object characteristics from a source other than the acquired video image data, and (iii) links each identified object to associated object characteristics and other object characteristics, wherein the linked information is stored in the object database.

6. The system of claim 5, further comprising:

a video database operating on a computer readable medium that stores the video image data in association with each of the identifications of the video image data from which the objects and object characteristics are identified.

7. The system of claim 6, wherein the user interface presents each of the identifications associated with the objects and object characteristics of the returned results, and the user interface is configured to access and present the video image data from the video database associated with each of the identifications.

* * * * *